United States Patent [19]

Yamamoto et al.

[11] Patent Number: 5,064,887

[45] Date of Patent: Nov. 12, 1991

[54] FLAME RETARDANT POLYPHENYLENE ETHER RESIN COMPOSITION

[75] Inventors: Naoki Yamamoto; Akira Yanagase, both of Hiroshima; Hisaya Yokohama, Obtake, all of Japan

[73] Assignee: MRC Techno Co., Ltd., Tokyo, Japan

[21] Appl. No.: 434,179

[22] Filed: Nov. 13, 1989

[30] Foreign Application Priority Data

Nov. 14, 1988 [JP] Japan ................... 63-287462

[51] Int. Cl.$^5$ ............................................. C08K 5/523
[52] U.S. Cl. .................... 324/145; 524/492; 524/493
[58] Field of Search ............... 524/145, 151, 492, 493

[56] References Cited

U.S. PATENT DOCUMENTS

| | | | |
|---|---|---|---|
| 3,361,851 | 1/1968 | Gowan | 524/897 |
| 4,128,602 | 12/1978 | Katchman et al. | 260/876 |
| 4,226,761 | 10/1980 | Cooper et al. | 525/63 |
| 4,233,199 | 11/1980 | Abolins et al. | 524/139 |
| 4,297,266 | 10/1981 | Ibsen et al. | 524/493 |
| 4,535,106 | 8/1985 | Abolins et al. | 524/151 |
| 4,894,415 | 1/1990 | Sasaki et al. | 524/151 |

FOREIGN PATENT DOCUMENTS

| | | |
|---|---|---|
| 42-7069 | 3/1967 | Japan . |
| 46-2345 | 10/1971 | Japan . |
| 49-6379 | 2/1974 | Japan . |
| 53-418 | 1/1979 | Japan . |
| 55-75444 | 6/1980 | Japan . |
| 1275141 | 5/1972 | United Kingdom . |
| 1590549 | 6/1981 | United Kingdom . |

*Primary Examiner*—Veronica P. Hoke
*Attorney, Agent, or Firm*—Cushman, Darby & Cushman

[57] ABSTRACT

A flame retardant polyphenylene ether resin composition excellent in heat aging resistance and impact resistance is disclosed. The composition comprises
(A) a polyphenylene ether resin,
(B) an aromatic alkenyl resin,
(C) a modified polyorganosiloxane having an average particle diameter of 0.08 to 0.6 μm,
(D) a phosphate, and
(E) a particulate silicic acid.

3 Claims, No Drawings

FLAME RETARDANT POLYPHENYLENE ETHER RESIN COMPOSITION

BACKGROUND OF THE INVENTION

1. Field of the Invention

The present invention relates to an impact resistant and heat aging resistant polyphenylene ether resin composition excellent in flame retardancy.

2. Description of the Prior Art

Since polyphenylene ether resins provide moldings excellent in heat resistance and rigidity, the application thereof as an engineering plastic is increasing, and attempts to enhance its performance are being made. For example, as a method of improving the impact resistance of moldings of polyphenylene ether resins, blending of polybutadiene elastomers is disclosed in Japanese Patent Publication No. 32731/1972. However, in such a method, since unsaturated bonds remain in the polybutadiene elastomer, the blended resin thus obtained is thermally unstable and the resin is not excellent in heat aging resistance.

When the application to electric parts that are increasing in recent years is considered, in addition to heat aging resistance, flame retardancy and impact resistance are required to be improved.

It is disclosed in Laid Open Japanese Patent Application 69859/1988 that when a modified polyorganosiloxane polymer was used as a source of an impact resistant rubber, a resin having an excellent impact resistance, heat resistance and mechanical strength could be acquired. Further, Japanese Patent Publication No. 418/1978 discloses the addition of a phosphate to a polyphenylene ether resin to improve the flame retardancy of the resin.

However, even if a phosphate is added to the polyphenylene ether resin blended with a modified polyorganosiloxane polymer, satisfactory flame retardancy of the blend was not secured actually.

SUMMARY OF THE INVENTION

The object of the present invention is to provide a polyphenylene ether resin composition excellent in heat aging resistance, impact resistance, and flame retardancy.

The present invention relates to a flame retardant polyphenylene ether resin composition comprising
(A) a polyphenylene ether resin,
(B) an aromatic alkenyl resin,
(C) a modified polyorganosiloxane having an average particle diameter of 0.08 to 0.6 μm,
(D) a phosphate, and
(E) a particulate silicic acid.

DETAILED EXPLANATION OF THE INVENTION

The polyphenylene ether resin (A) used in the present invention is a homopolymer or a copolymer having the repeating units represented by the following formula:

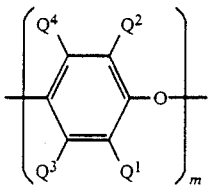

wherein $Q^1$ to $Q^4$ each represents independently a hydrogen atom or an aliphatic hydrocarbon group having 1 to 4 carbon atoms, and m is a number of 30 or over.

As the aliphatic hydrocarbon group having 1 to 4 carbon atoms, a methyl group, an ethyl group, an n-propyl group, an i-propyl group, an n-butyl group, and an i-butyl group can be exemplified.

Specific examples of the polyphenylene ether resins are poly(2,6-dimethyl-1,4-phenylene) ether, poly(2,6-diethyl-1,4-phenylene) ether, poly(2,6-dipropyl1,4-phenylene) ether, poly(2-methyl-6-ethyl-1,4-phenylene) ether, poly(2-methyl-6-propyl 1,4-phenylene) ether, poly(2-ethyl-6-propyl-1,4-phenylene) ether, copolymer of (2,6-dimethyl-1,4-phenylene) ether with (2,3,6-trimethyl-1,4-phenylene) ether, copolymer of (2,6-diethyl-1,4-phenylene) ether with (2,3,6-trimethyl-1,4-phenylene) ether, and copolymer of (2,6-dimethyl-1,4-phenylene) ether with (2,3,6-triethyl-1,4-phenylene) ether. Particularly, the copolymer of (2,6-dimethyl-1,4-phenylene) ether with (2,3,6-trimethyl-1,4-phenylene) ether is preferable, and poly(2,6-dimethyl-1,4-phenylene) ether is more preferable. Although the degree of polymerization of the polyphenylene ether resin used in the present invention is not particularly limited, it is preferable to use polyphenylene ether resin having a reduced viscosity of 0.3 to 0.7 dl/g in chloroform as solvent at 25° C. A polyphenylene ether resin having a reduced viscosity of lower than 0.3 dl/g tends to deteriorate the heat stability whereas the resin having a reduced viscosity higher than 0.7 dl/g tends to spoil the moldability of the resin composition. The polyphenylene ether resins may be used alone or in combination.

The aromatic alkenyl resin (B) used in the present invention is a homopolymer of aromatic vinyl monomer units represented by the following formula:

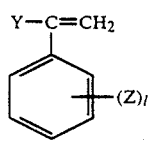

wherein Y represents a hydrogen atom or an alkyl group having 1 to 4 carbon atoms, Z represents a halogen atom or an alkyl group having 1 to 4 carbon atoms, and l is 0 or a number of 1 to 3, or a copolymer comprising more than 50% by weight of such aromatic vinyl monomer units and less than 50% by weight of other monomer units having a carbon-carbon double bond copolymerizable therewith. Specific examples of the aromatic alkenyl resin include polystyrene, polychlorostyrene, polybromostyrene, poly-α-methylstyrene, styrene/acrylonitrile copolymer, styrene/methyl methacrylate copolymer, styrene/maleic anhydride copolymer, styrene/maleimide copolymer, styrene/N-phenylmaleimide copolymer, and styrene/acrylonitrile/α-methylstyrene terpolymer, with polystyrene being particularly preferable.

The modified polyorganosiloxane polymer (C) used in the present invention is a polyorgaoosiloxane graft copolymer prepared by graft-copolymerizing a vinyl monomer to a polyorganosiloxane rubber formed by polymerizing an organosiloxane, a crosslinking agent for the polyorganosiloxane rubber (I), and if desired a grafting agent for the polyorganosiloxane rubber (II) in such a manner that a polymer in the form of fine particles is formed, or a compound-rubber graft copolymer prepared by graft-polymerizing a vinyl monomer to a compound-rubber wherein the polyorganosiloxane rubber and a polyalkyl (meth)acrylate rubber are entangled.

It is required that the average particle diameter of the modified polyorganosiloxane polymer is in the range of 0.08 to 0.6 μm. If the average particle diameter is smaller than 0.08 μm, the impact resistance of the moldings of the resin composition obtained therefrom is poor, whereas if the average particle diameter is larger than 0.6 μm, the impact resistance of the moldings of the resin composition is poor, and the surface appearance of the moldings become also poor. In order to produce a compound rubber having such an average particle diameter, the emulsion polymerization is most suitable.

A polyorganosiloxane rubber component constituting the polyorganosiloxane rubber or the compound-rubber explained above can be prepared by the emulsion polymerization using an organosiloxane, a crosslinking agent (I), and if desired a grafting agent (II) given below.

As the organosiloxanes, cyclic organosiloxanes having at least three-membered ring can be used, and preferable examples are 3- to 6-membered cyclic organosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane, which can be used alone or as a mixture of two or more of them. It is preferable that the component originated from such an organosiloxane occupies more than 50% by weight, and more preferably more than 70% by weight, of the polyorganosiloxane rubber.

As the crosslinking agent (I), a trifunctional or tetrafunctional silane can be used, and in particular trialkoxysilanes or tetraalkoxysilanes are preferable. Exemplary crosslinking agents for the polyorganosiloxane rubber include trimethoxymethylsilane, triethoxyphenylsilane, tetramethoxysilane, tetraethoxysilane, tetra-n-propoxysilane, and tetrabutoxysilane. Among them, tetraethoxysilane is most preferable. The amount of the crosslinking agent (I) to be used is 0.1 to 30% by weight of the polyorganosiloxane rubber component.

In the present invention, the term "grafting agent" refers to a compound having a functional group to which a vinyl monomer is grafted when the vinyl monomer is polymerized in the presence of a rubber that has previously been prepared. Thus, the grafting agent becomes one component of the rubber or compound-rubber. As the grafting agent for the polyorganosiloxane rubber (II), silane compounds having a vinyl polymerizable functional group and silane compounds capable of chain transfer can be used. Exemplary grafting agents include compounds capable of forming units represented by the following formula:

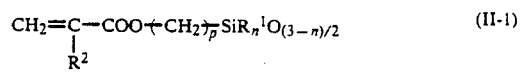

wherein $R^1$ represents a methyl group, an ethyl group, a propyl qroup, or a phenyl group, $R^2$ represents a hydrogen atom, or a methyl group, n is 0, 1 or 2, and P is a number of 1 to 6.

Because (meth)acryloyloxysiloxanes capable of forming the units of formula (II-1) have high graft efficiency, and therefore can form effective graft chains, (meth)acryloyloxysiloxanes are advantageous in view of the development of impact resistance. As those capable of forming the units of formula (II-1), methacryloyloxysiloxanes are particularly preferable. Specific examples of methacryloyloxysiloxanes include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane. The amount of the grafting agent (II) to be used is 0 to 10% by weight of the polyorganosiloxane rubber component.

Preparation of a latex of the polyorganosiloxane rubber is preferably carried out, for example, by shear-mixing a mixture of the organosiloxane, the crosslinking agent (I), and if desired the grafting agent (II) together with water in the presence of a sulfonic acid emulsifier such as alkylbenzenesulfonic acids and alkylsulfonic acids using, for example, a homogenizer. Alkylbenzenesulfonic acids are preferable because they can serve as an emulsifier for the organosiloxane and can also serve as a polymerization initiator. In this case, the additional use of an alkylbenzenesulfonic acid metal salt, an alkylsulfonic acid metal salt or the like is preferable because that is effective to keep the polymer stable in the graft polymerization.

The polyalkyl(meth)acrylate rubber component constituting the compound-rubber can be synthesized by using the alkyl (meth)acrylate, a crosslinking agent for the (meth)acrylate rubber (III), and a grafting agent for the (meth)acrylate rubber (IV) mentioned below.

As the alkyl (meth)acrylates, can be mentioned alkyl acrylates such as methyl acrylate, ethyl acrylate, n-propyl acrylate, n-butyl acrylate, and 2-ethylhexyl acrylate, and alkyl methacrylates such as hexyl methacrylate, 2-ethylhexyl methacrylate and n-lauryl methacrylate, with n-butyl acrylate being particularly preferable.

The crosslinking agent (III) causes a crosslinking reaction when the alkyl (meth)acrylate is polymerized to form a rubber, and as the crosslinking agent (III), is used a polyfunctional monomer having approximately the same reactivity as that of the double bond of the (meth)acrylate such as ethylene glycol dimethacrylate, propylene glycol dimethacrylate, 1,3-butylene glycol dimethacrylate, 1,4-butylene glycol dimethacrylate or allyl methacrylate.

The grafting agent (IV) is one having a functionality that does not react at the time of polymerization to form a rubber but react at the time of the subsequent graft polymerization, and as the grafting agent (IV), is used a polyfunctional monomer including both a double bond having approximately the same reactivity as that of the double bond of the (meth)acrylate and a double bond whose reactivity is lower than the former such as triallyl cyanurate and triallyl isocyanurate.

Although ally methacrylate is used as the crosslinking agent (III), since all the double bonds do not react at the time of polymerization to form a rubber, and thus a part of the double bonds remains after completion of the polymerization, allyl methacrylate can also be used as the grafting agent (IV).

These crosslinking agents (III) and the grafting agents (IV) can be used alone or as a mixture of two or more of them. The total amount of the crosslinking agent (III) and the grafting agent (IV) to be used is 0.1 to 20% by weight of the polyalkyl (meth)acrylate rubber component.

A latex of the polyorganosiloxane rubber is neutralized by addition of alkaline aqueous solution such as aqueous solution of sodium hydroxide, potassium hydroxide, or sodium carbonate, and the alkyl (meth)acrylate, the crosslinking agent (III) and the grafting agent (IV) are added to thus neutralized latex to cause them impregnate into particles of the polyorganosiloxane rubber, and then polymerization of the alkyl (meth)acrylate is carried out by adding a conventional radical polymerization initiator. In the progress of the polymerization, a crosslinked network of the polyalkyl (meth)acrylate rubber entangled with the crosslinked network of the polyorganosiloxane rubber is formed so that a latex of a compound-rubber, in which the polyorganosiloxane rubber component and the polyalkyl (meth)acrylate rubber component cannot substantially be separated each other, can be obtained. In the practice of the present invention, as the compound rubber, is preferably used a compound rubber wherein the main skeleton of the polyorganosiloxane rubber component has repeating units of dimethylsiloxane and the main skeleton of the polyalkyl (meth)acrylate rubber component has repeating units of n-butyl acrylate.

The polyorganosiloxane rubber or the compound-rubber prepared by emulsion polymerization in this manner can be graft-polymerized with a vinyl monomer, and as the vinyl monomer can be exemplified aromatic alkenyl compounds such as Styrene, α-methylstyrene, and vinyltoluene; methacrylates such as methyl methacrylate and 2-ethylhexyl methacrylate; acrylates such as methyl acrylate, ethyl acrylate, and butyl acrylate; and vinyl cyanides such as acrylonitrile and methacrylonitrile, which can be used alone or as a mixture of two or more of them. Of these vinyl monomers, aromatic alkenyl compounds are preferable, and styrene is particularly preferable.

The proportions of the polyorganosiloxane rubber or the compound-rubber and the vinyl monomer in the modified polyorganosiloxane polymer (C) are such that based on the weight of the polymer (C) the rubber or the compound-rubber is 30 to 95% by weight, and preferably 40 to 90% by weight, and the vinyl monomer is 5 to 70% by weight, and preferably 10 to 60% by weight. If the proportion of the vinyl monomer is less than 5% by weight, the modified polyorganosiloxane (C) is not well dispersed in the resin composition whereas if the proportion is over 70% by weight, the development of the impact strength in the final resin composition is low.

The modified polyorganosiloxane polymer (C) can be prepared by adding the vinyl monomer to a latex of the polyorganosiloxane rubber or the compound-rubber, polymerizing the mixture in one step or several steps by the radical polymerization technique, and putting thus obtained latex into hot water in which a metal salt such as calcium chloride or magnesium sulfate is dissolved to salt out and coagulate the latex thereby separating and recovering the polymer product.

The phosphate (D) used in the present invention is not particularly limited, but it is preferable to use one that exhibits a high effect as a plasticizer and a flame retardant. Preferable phosphate compounds are compounds represented by the following formula:

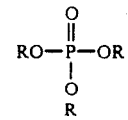

wherein each of R groups represents independently an alkyl group, an aryl group, an aryl-substituted alkyl group, or a halogen-substituted aryl group all of the groups having up to 20 carbon atoms.

Specific examples of such compounds are triphenyl phosphate, tricresyl phosphate, trixylenyl phosphate, cresyl diphenyl phosphate, xylenyl diphenyl phosphate, trimethyl phosphate, triethyl phosphate, tributyl phosphates, tri-2-ethylhexyl phosphate, trisbutoxyethyl phosphate, trischloroethyl phosphate, trisdichloropropyl phosphate, and tristearyl phosphate. Of these, triphenyl phosphate is preferable in view of giving excellent flame retardancy to the resin composition.

As the particulate silicic acid (E) used in the present invention, commercially available silica can be generally used. As the particulate silicic acid, there are one prepared from alkoxysilanes by the wet process, and on prepared by the hydrolysis process of silicon chloride in an oxyhydrogen flame, that is, by the combustion hydrolysis process. They are considerably different from each other in amount of adsorption of water, and as the particulate silicic acid used in the present invention the one prepared by the combustion hydrolysis process is preferably used. The diameter of the primary particles of the particulate silicic acid obtained by the wet process and the diameter of the primary particles of particulate silicic acid obtained by the combustion hydrolysis process are both 0.01 to 0.04 μm, and the primary particles of that obtained by the combustion hydrolysis process are spherical in shape and are agglomerated in an amorphous manner. When particulate silicic acid agglomerates obtained by the combustion hydrolysis process is heated together with dimethylchlorosilane to about 400° C to react the silanol groups on the surfaces of the silicic acid particles with the dimethylchlorosilane thereby reducing the amount of the silanol groups, that is, particulate silicic acid agglomerates that have been made hydrophobic are used, further excellent impact resistance can be exhibited.

In the present invention, flame retardancy and impact resistance can be improved by the combination of the particulate silicic acid and the phosphate.

In the present resin composition, the polyphenylene ether resin (A) (hereinafter referred to as component (A)), the aromatic alkenyl resin (B) (hereinafter referred to as component (B)), the modified polyorganosiloxane (C) (hereinafter referred to as component (C)), the phosphate (D) (hereinafter referred to as component (D)), and the particulate silicic acid (E) (hereinafter referred to as component (E)) can be combined in widely varied proportions. The performance of the present resin composition can be freely designed by varying the proportions of the components. To secure practically enough mechanical properties, heat resistance, impact resistance, flame retardancy, and moldability, it is preferable to combine 2 to 40 parts by weight of the component (D), and 0.01 to 10 parts by weight of the component (E) for 100 parts by weight of the total of the component (A), the component (B), and the component (C).

Further, to secure the performance of the polyphenylene ether resin sufficiently, it is preferable that 2 to 40 parts by weight of the component (D) and 0.01 to 10 parts by weight of the component (E) are combined for 100 parts by weight of the total of the components (A), (B), and (C), with the component (A) being in the range of 20 to 80 parts by weight, the component (B) being in the range of 20 to 75 parts by weight, and the component (C) being in the range of 1 to 40 parts by weight.

If the component (A) is less than 20 parts by weight, there is a tendency not to provide enough heat resistance whereas if the component (B) exceeds 80 parts by weight, there is a tendency to lower the moldability. If the component (B) is less than 20 parts by weight, there is a tendency to make it difficult to balance the moldability and the heat resistance whereas if the component (B) exceeds 75 parts by weight, there is a tendency to make it difficult to balance the impact resistance and the heat resistance. If the component (C) is less than 1 part by weight, there is a tendency to make the impact resistance not enough whereas if the component (C) exceeds 40 parts by weight, the mechanical strength lowers. If the component (D) is less than 2 parts by weight, the flame retardancy does not become enough whereas if the component (D) exceeds 40 parts by weight, there is a tendency to lower the heat resistance. If the component (E) is less than 0.01 part by weight, there is a tendency to make the impact resistance and the flame retardancy not enough whereas if the component (E) exceeds 10 parts by weight, there is a tendency to lower the moldability.

To prepare the present resin composition, the components (A), (B), (C), (D), and (E) are mixed mechanically by a known apparatus such as a banbury mixer, a roll mill, and a twin-screw extruder, and are shaped into pellets.

If required, the present resin composition may be blended with stabilizers, lubricants, pigments, reinforcing agents, fillers, etc. Specific examples thereof are stabilizers such as triphenyl phosphite, lubricants such as polyethylene wax and polypropylene wax, pigments such..as titanium oxide, zinc sulfide, and zinc oxide, reinforcing agents such as glass fiber, and carbon fiber, and fillers such as asbestos, wollastonite, mica, and talc.

EXAMPLES

The present invention will now be described specifically with reference to the following Examples, wherein the physical properties were measured according to the following methods:

Izod impact strength: according to the method of ASTM D 256 (with a ¼" notch).

Flame test: according to the method of UL 94 specification (vertical flame test using test pieces 1/16" in thickness, ½" in width, and 5" in length).

Heat aging resistance: Izod test pieces were aged in a Geer's oven at 100° C., and after 500 hours, the retention of the impact resistance was measured.

All parts and percentages in the Examples are by weight unless otherwise specified. Preparation of a modified organosiloxane polymer:

Reference Example 1

2 parts of tetraethoxysilane, 0.5 parts of γ-methacryloyloxypropyldimethoxymethylsilane, and 97.5 parts of octamethylcyclotetrasiloxane were mixed to prepare 100 parts of a siloxane mixture. 100 parts of the siloxane mixture were added to 200 parts of distilled water in which 1 part of sodium dodecylbenzenesulfonate and 1 part of dodecylbenzenesulfonic acid were dissolved, and then they were stirred at 10,000 rpm preparatorily by a homomixer, and then were emulsified at a pressure of 300 kg/cm$^2$ by a homogenizer to prepare an organosiloxane latex. This liquid mixture was transferred into a separable flask equipped with a condenser and stirring blades. After heated at 80° C. for 5 hours with stirring, the latex was allowed to stand at 20° C. for 48 hours, and then the latex was neutralized with an aqueous sodium hydroxide solution to a pH of 6.9 to conclude the polymerization thereby producing a polyorganosiloxane rubber latex 1. The yield of polymerization for the polyorganosiloxane rubber thus prepared was 89.7%, and the average particle diameter of the polyorganosiloxane rubber was 0.16 μm.

234.1 parts of the polyorganosiloxane rubber latex 1 were charged into a separable flask equipped with a stirrer, 60 parts of distilled water were added thereto, and after the atmosphere in the separable flask was replaced with nitrogen, the mixture was heated to 60° C. A mixture of 0.002 parts of ferrous sulfate, 0.006 parts of disodium ethylenediamine-tetraacetic acid, 0.26 parts of Rongalit, and 5 parts of distilled water was added thereto, then a mixture of 0.1 parts of cumene hydroperoxide and 30 parts of styrene was added thereto dropwise over 30 minutes, and thereafter the temperature of the mixture was kept at 70° C. for 3 hours to polymerize the styrene. The conversion of the styrene at polymerization was 92.1%.

The graft copolymer latex thus obtained was added dropwise into 300 parts of hot water containing 1.5 wt.% of calcium chloride thereby coagulating the latex, and the copolymer was separated from the water and dried at 80° C. for 20 hours, so that a polyorganosiloxane graft copolymer (hereinafter referred to as S-1) was obtained in an amount of 96.4 parts in the form of a dry powder.

Reference Example 2

117 parts of the polyorganosiloxane rubber latex obtained in the course of the preparation of the polyorganosiloxane graft copolymer (S-1) in Reference Example 1 were placed in a separable flask equipped with a stirrer, 57.5 parts of distilled water added thereto, the atmosphere in the separable flask was replaced with nitrogen, the mixture in the separable flask was heated to 60° C., then a mixture of 49 parts of n-butyl acrylate, 1.0 part of ally methacrylate, and 0.26 parts of tert-butyl hydroperoxide was added thereto, and they were stirred for 30 minutes to allow the mixture to penetrate into the polyorganosiloxane rubber particles. Then, a mixture of 0.002 parts of ferrous sulfate, 0.006 parts of disodium ethylenediamine-tetraacetic acid, 0.26 parts of Rongalit, and 5 parts of distilled water was added thereto to initiate the radical polymerization, and thereafter the internal temperature was kept at 70° C. for 2 hours to polymerize the monomers thereby producing a compound-rubber latex. A part of the latex was taken out, and the average particle diameter of the compound rubber was measured and was found to be 0.19 μm. Then the latex was dried to obtain a solid polymer, the extraction with toluene at 90° C. for 12 hours was carried out, and the content of the gel was measured and was found to be 97.3%. A mixture of 0.12 parts of tert-butyl hydroperoxide and 15 parts of methyl methacrylate was added dropwise to the compound-rubber latex at 70° C. over 15 minutes, and thereafter the temperature was kept at 70° C. for 4 hours to perform the graft polymerization of the methyl methacrylate to the compound-rubber. The conversion of the methyl methacrylate at polymerization was 99.5%. The resulting graft copolymer latex was added dropwise into 200 parts of hot water containing 15% of calcium chloride thereby coagulating the latex, and the copolymer was separated, washed with water and dried at 75° C. for 16 hours, so that a compound-rubber copolymer (hereinafter referred to as S-2) was produced in an amount of 96.5 parts in the form of a dry powder.

Reference Example 3

2 parts of tetraethoxysilane, and 98 parts of octamethylcyclotetrasiloxane were mixed to give 100 parts of a siloxane mixture. Thereafter the same procedure and conditions for preparing the polyorganosiloxane rubber latex 1 as used in Reference Example 1 were used to give a polyorganosiloxane latex 2. The conversion was 86.8%, and the average particle diameter of the polyorganosiloxane rubber was 0.14 μm.

111 parts of this polyorganosiloxane rubber latex 2 were taken out, and were placed in a separable flask equipped with a stirrer, 60 parts of distilled water were added thereto, the atmosphere in the separable flask was replaced with nitrogen, and the temperature was elevated to 60° C. Then, a mixture of 56.8 parts of n-butyl acrylate, 1.2 parts of ally methacrylate, and 0.24 parts of tert-butyl hydroperoxide was added thereto, and after the mixture was stirred for 30 minutes, the polymerization was initiated by using the same redox initiator as used in Reference Examples 1 and 2. Thereafter, the internal temperature was kept at 70° C. for 2 hours to polymerize the monomers and to give a compound-rubber latex.

A mixture of 0.1 parts of cumene hydroperoxide and 10 parts of styrene was added dropwise to this latex at 70° C. over 10 minutes, and thereafter the temperature was kept at 70° C. for 3 hours to perform the graft polymerization of the styrene. The conversion of the styrene at polymerization was 92.1%. The resultant latex was subjected to the salting out, coagulation, and drying in the same manner as that of Reference Examples 1 and 2 to produce a compound-rubber graft copolymer (hereinafter referred to as S-3) in an amount of 95.8 parts in the form of a dry powder.

Example 1

45 parts of poly(2,6-dimethyl-1,4-phenylene) ether whose reduced viscosity measured in chloroform at 25° C. was 0.59 dl/g, 45 parts of polystyrene resin (Esbrite 8 ® manufactured by Nihon Polystyrene KK), 10 parts of the polyorganosiloxane graft copolymer S-1 prepared in Reference Example 1, 5 parts of triphenyl phosphate (Plasticizer TPP manufactured by Daihachi Kagaku KK), and 1 part of hydrophobic particulate silicic acid (Aerosil R-972 manufactured by DEGUSSA, which was silicic acid having an average diameter of the primary particles of 0.02 μm obtained by the combustion hydrolysis process and rendered hydrophobic) were melted and kneaded by a twin-shaft extruder (ZSK-30 manufactured by Werner & Pfleiderer) at 270° C., extruded therefrom and cut into pellets of a polyphenylene ether resin composition. The pellets were dried, and were molded at a cylinder temperature of 280° C. and a mold temperature of 70° C. by an injection molder (Promat 165/70 type injection molding machine manufactured by SUMITOMO HEAVY INDUSTRIES, LTD.) to form test pieces. Using these test pieces, tests for the Izod impact strength, the flame (UL-94 test) and the heat aging resistance were carried out. The results are shown in Table 1.

Comparative Example 1

45 parts of polyphenylene ether resin that was the same resin as that used in Example 1, 45 parts of high-impact polystyrene (Esbrite 500SB ®), 5 parts of triphenyl phosphate (Plasticizer TPP), and 1 part of hydrophobic particulate silicic acid (Aerosil R-972) were pelletized in the same manner as that in Example 1 thereby forming test pieces, and using the test pieces, tests for the Izod impact strength, the flame (UL-94 test) and the heat aging resistance were carried out. The results are shown in Table 1.

Comparative Example 2

45 parts of polyphenylene ether resin that was the same resin as that used in Example 1, 45 parts of polystyrene resin (Esbrite 7 ®), and 10 parts of S-1 were melted, kneaded, and molded in the same manner as that in Example 1 to form test pieces, and using the test pieces, tests for the Izod impact, the flame (UL-94 test) and the heat aging were carried out. The results are shown in Table 1.

As apparent by comparing Example 1, and Comparative Examples 1 to 2, it can be understood that the present polyphenylene ether resin composition had excellent impact resistance, heat aging resistance, and fire retardancy.

TABLE 1

| | Izod impact strength (kg · cm/cm) | UL-94 test (1/16" in thickness) | | Heat aging resistance *(%) |
| --- | --- | --- | --- | --- |
| | | Rank | Combustion time (sec) | |
| Example 1 | 24.0 | V-1 | 78 | 93 |
| Comparative Example 1 | 10.2 | V-1 | 54 | 55 |
| Comparative Example 2 | 17.5 | — | 320 There was a drip. | 91 |

*Retention of impact strength

Examples 2 to 4

45 parts of polyphenylene ether resin that was the same resin as that used in Example 1, 45 parts of polystyrene resin (Esbrite 7 ®), 10 parts of S-1, 5 parts of cresyl diphenyl phosphate (CPP manufactured by Daihachi Kagaku KK), and 1 part of particulate silicic acid (OX-50 having an average diameter of the primary particles of 0.025 μm obtained by the combustion hydrolysis process and manufactured by Nippon Aerosil Corp.) were melted, kneaded, and molded in the same manner as that in Example 1, and the Izod impact strength and the flame retardancy were measured (Example 2). The results are shown in Table 2.

45 parts of the same polyphenylene ether resin as used in Example 1, 45 parts of polystyrene resin (Esbrite 7 ®), 10 parts of compound-rubber graft copolymers S-2 or S-3 prepared in Reference Examples 2 or 3, 5 parts of triphenyl phosphate (Plasticizer TPP), and 1 part of the particulate silicic acid (Aerosil R-972) were melted, kneaded and molded in the same manner as that in Example 1 (Examples 3 and 4), and the results are shown in Table 2.

From Examples 2 to 4, it can be understood that according to the present invention, a resin composition from either the polyorganosiloxane graft polymer and the compound-rubber graft polymer showed excellent impact resistance and flame retardancy.

TABLE 2

|  | Modified polyorgano-siloxane polymer | Izod impact strength (kg · cm/cm) | UL-94 test (1/16" in thickness) | |
|---|---|---|---|---|
|  |  |  | Rank | Combustion total time (sec) |
| Example 2 | S-1 | 22.6 | V-1 | 72 |
| Example 3 | S-2 | 25.4 | V-1 | 77 |
| Example 4 | S-3 | 23.2 | V-1 | 69 |

Examples 5 to 8, and Comparative Examples 3 to 4

40 parts of polyphenylene ether resin that was the same resin as that used in Example 1, 50 parts of polystyrene resin (Esbrite 7 ®), 10 parts of S-1, and triphenyl phosphate (Plasticizer TPP) and hydrophobic particulate silicic acid (Aerosil R-972) in amounts shown in Table 3 were melted, kneaded, and molded in the same manner as that in Example 1, and tests for the Izod impact strength, and the flame (UL-94 test) were carried out. The results are shown in Table 3. For comparison, the same procedures were repeated except that resin compositions outside the claims of the present invention were used. The results for the tests are shown in Table 3.

TABLE 3

|  | Triphenyl phosphate (part) | Particulate silicic acid (part) | Izod impact strength (kg · cm/cm) | UL-94 test (1/16" in thickness) |
|---|---|---|---|---|
| Example 5 | 3 | R-972 1 | 24.0 | V-1 |
| Example 6 | 3 | K-320 1 | 20.4 | V-1 |
| Example 7 | 8 | R-972 1 | 26.5 | V-0 |
| Example 8 | 10 | R-972 2 | 29.0 | V-0 |
| Comparative Example 3 | 8 | — 0 | 14.3 | V-2 |
| Comparative Example 4 | 0 | R-972 2 | 15.0 | (burnt) |

By comparing Examples 5 to 8 and Comparative Examples 3 to 4, it can be understood that the use of the phosphate and the particulate silicic acid defined in the present invention improved both impact resistance and flame retardancy remarkably.

Example 9, and Comparative Examples 5 to 6

The resin compositions prepared in Example 1, and Comparative Examples 1 to 2 and 30 parts of glass fiber (chopped strands, RES03-TP68, manufactured by Nippon Sheet Glass Company, Limited ) were melted, kneaded and pelletized at 280° C. by a 40 m/m extruder, and then formed into test pieces. The results of the tests are shown in Table 4. It can be understood that the composition according to the present invention showed excellent flame retardancy even in the glass fiber reinforced system. In Comparative Example 5, the resin composition of Comparative Example 1 was used, and for Comparative Example 6, the resin composition of Comparative Example 2 was used.

TABLE 4

|  | Izod impact strength (kg · cm/cm) | UL-94 test (1/16" in thickness) | |
|---|---|---|---|
|  |  | Rank | Combustion total time (sec) |
| Example 9 | 11.3 | V-1 | 81 |
| Comparative Example 5 | 2.1 | V-1 | 79 |
| Comparative Example 6 | 5.2 | — | (burnt) |

Examples 10 to 13

40 parts of polyphenylene ether resin that was the same resin as that used in Example 1, 50 parts of polystyrene resin (Esbrite 7 ®), 10 parts of polyorganosiloxane graft copolymer S-1, and phosphates shown in Table 5 and hydrophobic particulate silicic acid (Aerosil R-972) in amounts shown in Table 5 were melted, kneaded, and molded in the same manner as that in Example 1, and tests for the Izod impact strength and the flame (UL-94 test) were carried out. The results are shown in Table 5. It can be understood that all of them showed good performance.

TABLE 5

|  | Phosphate* (part) | Particulate silicic acid (part) | Izod impact strength (kg · cm/cm) | UL-94 test (1/16" in thickness) (rank) |
|---|---|---|---|---|
| Example 10 | Tributyl phosphate | 5 | 1 | 19.4 | V-1 |
| Example 11 | Trischloroethyl phosphate | 5 | 1 | 21.4 | V-1 |
| Example 12 | Tristearyl phosphate | 5 | 1 | 22.1 | V-1 |
| Example 13 | 2-ethylhexyl-diphenyl phosphate | 5 | 1 | 19.9 | V-1 |

*Phosphates in the Table 5 are all plasticizers manufactured by Daihachi Kagaku KK.

Although the invention has been described with preferred embodiments, it is to be understood that variations and modifications may be employed without departing from the concept of the invention as defined the following claims.

What we claim is:

1. A flame retardant polyphenylene ether resin composition comprising
   (A) about 20 to 80 parts by weight of a polyphenylene ether resin,
   (B) about 20 to 75 parts by weight of an aromatic alkenyl resin,
   (C) about 1 to 4 parts by weight of a modified plyorganosiloxane having an average particle diameter of 0.08 to 0.6 μm, said modified polyorganosiloxane being selected from the group consisting of
a polyorganosiloxane graft polymer prepared by graft-polymerizing a vinyl monomer to a polyorganosiloxane rubber, and
a compound-rubber graft polymer prepared by graft-polymerizing a vinyl monomer to a compound-rubber wherein a polyorganosiloxane rubber and a prolyalkyl (meth)acrylate rubber are entangled;
(D) about 2 to 40 parts by weight of a phosphate represented by the following general formula

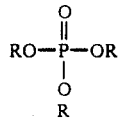

wherein R is selected from the group consisting of a an alkyl group, an aryl group, an alkyl-substituted aryl group, an aryl-substituted alkyl group and a halogen-substituted aryl group, and
(E) about 0.01 to 10 parts by weight of a particulate silicic acid,
said silicic acid being an agglomerate of hydrophobic silicone dioxide particles prepared by a combustion hydrolysis process and the diameter of primary particles of which are from 0.01 to 0.04 μm, all concentration ranges being based upon 100 parts by weight of the total of the polyphenylene ether resin, the aromatic alkenyl resin and the modified polyorganosiloxane polymer.

2. A flame retardant polyphenylene ether resin composition of claim 1, wherein said aromatic alkenyl resin is polystyrene.

3. A flame retardant poloyphenylene ether resin composition of claim 5, wherein said phosphate is triphenyl phosphate.

* * * * *